United States Patent Office 3,560,233
Patented Feb. 2, 1971

3,560,233
PROCESS FOR PRODUCING ZIRCONIUM-
VANADIUM-SILICA PIGMENT
Alfred L. Hock, Manchester, England, assignor to
Magnesium Elektron Limited, Manchester, England
No Drawing. Continuation-in-part of application Ser. No.
622,023, Mar. 8, 1967. This application Sept. 12, 1969,
Ser. No. 857,541
Int. Cl. C09c 1/00
U.S. Cl. 106—299                          1 Claim

ABSTRACT OF THE DISCLOSURE

A process for producing zirconium-vanadium-silica pigment comprising heating mixture of zirconium oxide, silica, vanadium pentoxide (or a vanadium compound which gives the pentoxide on heating), an alkali-metal fluoride and a substance containing sulphur oxy-acid ions which are substantially or completely volatile in the heating stage of the pigment-making process.

---

This application is a continuation-in-part of application Ser. No. 622,023, filed Mar. 8, 1967, now abandoned.

This invention relates to ceramic pigments and more particularly to the production of the zirconium-vanadium-silica pigment known as zirconium-vanadium turquoise blue. This pigment is made, in accordance with British Pat. No. 625,448 from a mixture of zirconium oxide, silica, vanadium pentoxide (or a vanadium compound such as ammonium vanadate which gives the pentoxide on heating) and an alkali-metal fluoride such as sodium fluoride.

It is known from X-ray investigation that during the formation of the pigment by calcination of the mixture between 800° C. and 1000° C. (e.g., 850° C.), the zirconium oxide and the silica must combine to form zirconium silicate (zircon), and this temperature is far lower than the temperature at which zirconium oxide and silica will combine normally even in the presence of sodium fluoride. The vanadium must therefore act as a catalyst in the reaction and the commonly accepted mechanism of formation of the blue pigment presumes reduction of vanadium pentoxide, $V_2O_5$, to the blue vanadyl ion $VO_2^+$ and the incorporation of this ion into the zircon lattice when this lattice is formed.

An important object in the industrial manufacture of zirconium-vanadium turquoise blue is to produce a pigment which is consistent in quality from batch to batch over long periods so that, when it is incorporated into the appropriate compatible ceramic glaze, it always leads to a coloured glaze of exactly the same desired tone and depth of blue colour (or of other colour if in admixture with another permissible pigment). This calls for very close control of the pigment-making process in respect of (a) quality and formulation of the mixture of raw materials, and (b) the calcination and subsequent treatment of the calcine.

It is known also that a formulation comprising zirconium oxide and silica in the ratio equivalent to zirconium silicate, ammonium vanadate and sodium fluoride in the proportions 62.8%, 31.0%, 3.9%, 2.3% can yield an acceptable pigment. The effect of various anions and cations on the tone and optimum intensity of colour has been studied by suitably modifying the above standard formulation and it has been claimed, for example that fluorine is a more efficient anion than chlorine or carbonate ions and that sodium is a better cation than the other alkali metals or the alkaline earth metals. The effect of many oxides is also known but they either do not improve the intensity of colour or they are detrimental in respect of colour tone.

It has now been found, in accordance with the present invention, that zirconium-vanadium-silica ceramic pigments of desirable blue tone and of greater intensity of colour than are otherwise obtainable can be obtained by incorporating into the mixture of the raw materials a proportion of sulphate or other sulphur oxy-acid ions which are substantially or completely volatile in the heating stage of the pigment-making process. Such proportion may correspond to an introduction of 0.2% to 2% by weight of $SO_3$ calculated on the weight of the total raw materials. Such sulphate or other sulphur oxy-acid ions can be incorporated as part of any of the four main components of the mixture or they may be added separately in the form of a compound whose cation will also be volatized in the calcining process unless this cation is zirconium and ends up as additional zirconium oxide.

Sulphate ions are a convenient and usually the most economical form of addition in accordance with the invention. Ammonium sulphate, ammonium bisulphate, any water soluble sulphate of zirconium or any insoluble basic sulphate of zirconium or any basic zirconium derivative containing added or adsorbed sulphate, are examples of compounds suitable for the purpose of the invention. In the case of a chemically precipitated basic zirconium derivative or zirconium oxide, sulphate ions, in accordance with the object of the invention, can be incorporated directly in the process of their manufacture.

The mechanism by which the increased intensity of colour is achieved is not known as yet. In line with the mechanism of pigment formation which presumes the intermediate formation of vanadyl ions, $VO_2^+$ it may be that the volatile sulphur oxides—containing gases which are produced during the calcination of the raw material to form the pigment favourably affect the ease or the rate of formation of such ions.

To illustrate the invention, pigments were prepared according to the formulation already indicated, from zirconium oxide in one instance virtually free from $SO_3$ (less than 0.1%) and in the other with $SO_3$ level adjusted to 1% by blending with the calculated amount of zirconium basic sulphate. Conditions of preparation were identical in each case.

Ceramic tiles were prepared under identical conditions with the pigments incorporated in equal amounts in the glaze frit. The colour developed in the glaze was measured, using a tristimulus spectrophotometer such as the MEECO Colormaster manufactured by Manufacturers Engineering and Equipment Corporation, Pennsylvania, U.S.A., and the data were recorded using the modified Adams system described in Journal of the Optical Society of America, vol. 32, page 168 (1942). The data were recorded using the modified Adams system in terms of $a$, $b$ and L, where an increase in "$-a$" represents a higher green saturation, and increase in "$-b$" represents a higher blue saturation, and an increase in L represents a whiter shade on the black to white scale. Typical values obtained are recorded below:

|  | $a$ | $b$ | L |
|---|---|---|---|
| Blue pigment ($SO_3$ 0.1%) | −11.2 | −22.4 | 69.38 |
| Blue pigment ($SO_3$ 1%) | −11.0 | −24.4 | 67.75 |

Whilst $a$ is virtually unaffected, the increase of 2.0 N.B.S. units in $-b$ indicates the significant improvement in the saturation of the blue.

Similar results were obtained when sulphate was added in other forms, e.g., ammonium sulphate, or where sulphate was present in sufficient quantity as a residue in the oxide.

The invention is illustrated by the following examples.

EXAMPLE 1

Pigments were prepared from the following formulation:

| | Percent |
|---|---|
| Zirconium oxide | 62.8 |
| Silica | 31.0 |
| Ammonium metavanadate | 3.9 |
| Sodium fluoride | 2.3 |

Ingredients were thoroughly dry mixed and calcined in covered crucibles at 850° C. for 5½ hours. The product was wet ball milled for 2 hours with 40% water, washed and dried, 6% by weight of pigment was incorporated into semi-opaque glaze in a water suspension containing 60% solids, and 4¼" biscuit tiles were spray coated to a wet weight of 17–18 g. per tile. After drying, the tiles were fired at 1020° C. with one hour soak at maximum temperature.

Colour values of the tiles were measured with a tristimulus spectrophotometer with illuminant C, and readings were converted to $a$, $b$ and $L$ values of the modified Adam's system, as described in the Journal of the Optical Society of America, vol. 32, page 168 (1942), where an increase in $-a$ represents a higher green saturation, and an increase in $-b$ represents a higher blue saturation, and an increase in $L$ represents higher reflectance or an increase in whiteness on the black to white scale.

Values obtained are as follows:

| | a | b | L |
|---|---|---|---|
| Tile 1 (Blue pigment from $ZrO_2$ containing 0.1% $SO_3$) | −11.2 | −22.4 | 69.38 |
| Tile 2 (Blue pigment from $ZrO_2$ containing 1.0% $SO_3$) | −11.0 | −24.4 | 67.75 |

EXAMPLE 2

Pigments were prepared from the following formulation:

| | Parts |
|---|---|
| Zirconium oxide | 59 |
| Silica | 29 |
| Ammonium metavanadate | 4 |
| Sodium fluoride | 3 |
| Sodium chloride | 5 |
| Potassium bromide | 3 |

After dry mixing, the ingredients were treated in a similar way to those described in Example 1. 5% of the pigment was incorporated into opaque glaze and tiles were spray coated, as described in Example 1.

Colour values obtained in the finished tiles were:

| | a | b | L |
|---|---|---|---|
| Tile 3 (0.1% $SO_3$ in $ZrO_2$) | −8.0 | −15.1 | 78.60 |
| Tile 4 (1% $SO_3$ in $ZrO_2$) | −7.6 | −16.5 | 77.48 |

The semi-opaque glaze was:

| | Percent |
|---|---|
| Frit | 85 |
| $ZrSiO_4$ | 5 |
| Clay | 10 |

Frit composition:

| | Percent by weight |
|---|---|
| $SiO_2$ | 50–65 |
| $Al_2O_3$ | 10–15 |
| $Na_2O + K_2O$ | 10 |
| CaO | 5–10 |
| ZnO | 0–10 |
| $B_2O_3$ | 5–10 |
| $ZrO_2$ added as zircon | 3–10 |

I claim:

1. A process for producing zirconium-vanadium-silica pigment comprising the step of heating to a temperature of about 800° C.–1000° C. a mixture comprised of zirconium oxide, silica, vanadium pentoxide and a substance containing sulphur oxy-acid ions selected from the group consisting essentially of ammonium sulphate, ammonium bisulphate, water soluble sulphate of zirconium, insoluble basic sulphates of zirconium, and basic zirconium derivatives containing added or absorbed sulphate, said sulphur oxy-acid ion being substantially completely volatile in the heating stage of the pigment-making process, the proportion of said substance corresponding to an introduction of 0.2% to 2% by weight of suphate calculated on the weight of the total raw materials.

References Cited

UNITED STATES PATENTS

| | | | |
|---|---|---|---|
| 2,871,138 | 1/1959 | Linnell | 106—299 |
| 2,889,232 | 6/1959 | Linnell | 106—299 |
| 2,441,447 | 5/1948 | Seabright | 106—299 |

FOREIGN PATENTS

| | | |
|---|---|---|
| 625,448 | 6/1949 | Great Britain. |

TOBIAS E. LEVOW, Primary Examiner

H. M. S. SNEED, Assistant Examiner